(12) United States Patent
Laur et al.

(10) Patent No.: US 10,676,179 B2
(45) Date of Patent: Jun. 9, 2020

(54) ELECTROMECHANICAL BRAKING METHOD FOR REDUCING VIBRATION

(71) Applicant: MESSIER-BUGATTI-DOWTY, Velizy Villacoublay (FR)

(72) Inventors: Marion Laur, Velizy Villacoublay (FR); Thomas LePage, Velizy Villacoublay (FR); Jean-Frederic Diebold, Velizy Villacoublay (FR); Philippe Chico, Velizy Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 211 days.

(21) Appl. No.: 14/061,852

(22) Filed: Oct. 24, 2013

(65) Prior Publication Data

US 2014/0116814 A1    May 1, 2014

(30) Foreign Application Priority Data

Oct. 31, 2012 (FR) .................................... 12 60402

(51) Int. Cl.
*B64C 25/44* (2006.01)
*B60T 8/17* (2006.01)
*B60T 13/74* (2006.01)
*B64C 25/42* (2006.01)

(52) U.S. Cl.
CPC ............ *B64C 25/44* (2013.01); *B60T 8/1703* (2013.01); *B60T 13/741* (2013.01); *B64C 25/426* (2013.01)

(58) Field of Classification Search
CPC ........ B60T 8/1703; B60T 8/345; B60T 8/173; B60T 13/741; B60T 2270/416; F16D 65/0006; F16D 2055/0091
See application file for complete search history.

(56) References Cited

U.S. PATENT DOCUMENTS

| | | | | |
|---|---|---|---|---|
| 4,923,056 A | * | 5/1990 | Nedelk | 188/71.1 |
| 5,172,960 A | * | 12/1992 | Chareire | 303/191 |
| 6,478,252 B1 | * | 11/2002 | Stimson et al. | 244/111 |
| 2003/0010583 A1 | * | 1/2003 | Arnold et al. | 188/106 R |
| 2004/0206589 A1 | * | 10/2004 | Kamiya et al. | 188/106 P |
| 2007/0175713 A1 | * | 8/2007 | DeVlieg et al. | 188/158 |
| 2009/0276133 A1 | | 11/2009 | May et al. | |
| 2010/0222942 A1 | * | 9/2010 | DeVlieg et al. | 701/3 |
| 2011/0226569 A1 | * | 9/2011 | DeVlieg | 188/158 |

FOREIGN PATENT DOCUMENTS

| | | |
|---|---|---|
| GB | 2 463 752 A | 3/2010 |
| WO | 01/15948 A2 | 3/2001 |

* cited by examiner

*Primary Examiner* — Bradley T King
*Assistant Examiner* — Stephen M Bowes
(74) *Attorney, Agent, or Firm* — Sughrue Mion, PLLC

(57) ABSTRACT

The invention relates to an electromechanical braking method for an aircraft having at least one electromechanical brake 2 fitted to at least one braked wheel 1 of the aircraft, the brake 2 having friction members 3 and a plurality of electromechanical actuators 4, each actuator 4 comprising a pusher 5 suitable for being moved by means of an electric motor 6 to selectively apply a pressing force on the friction members 3. According to the invention, for a given braking operation, a total braking force to be applied against the friction members 3 of the brake is distributed in non-uniform manner amongst the actuators 4 of the brake, such that at least two actuators 4 apply respective different forces.

10 Claims, 3 Drawing Sheets

ELECTROMECHANICAL BRAKING METHOD FOR REDUCING VIBRATION

The invention relates to an electromechanical braking method for an aircraft.

BACKGROUND OF THE INVENTION

An electromechanical brake for an aircraft generally comprises at least one electromechanical actuator comprising an electric motor and a pusher actuated by the motor to selectively apply a pressing force against friction elements of the brake, e.g. a stack of carbon disks.

During a braking operation on the aircraft, friction at the interfaces between the carbon disks give rise to vibration, and the level of that vibration can be very great. Such vibration is firstly perceived by pilots as indicating poor reliability, and secondly it gives rise to high levels of mechanical stress on landing gear and on all of the equipment situated on the landing gear, requiring the suppliers of such equipment to deploy major design efforts to ensure that the equipment retains satisfactory reliability in spite of the vibration.

Brake suppliers therefore seek to minimize such vibration and to make its level compatible with the requirements defined by aircraft manufacturers. Proposals have thus been made to attenuate vibration modes of a brake by breaking the symmetry of the structure of the brake, e.g. by adding openings or recesses that are distributed in non-uniform manner in the structure of the brake. That solution requires reinforcement to be added to the structure in order to compensate for the openings or recesses and in order to rebalance the brake, thereby tending to make the structure of the brake more complex and to increase its weight and its cost.

OBJECT OF THE INVENTION

An object of the invention is to reduce the vibration generated by electromechanical brake without making its structure complex and without increasing its weight or its cost.

SUMMARY OF THE INVENTION

In order to achieve this object, the invention provides an electromechanical braking method for an aircraft having at least one electromechanical brake fitted to at least one braked wheel of the aircraft, the brake having friction members and a plurality of electromechanical actuators, each actuator comprising a pusher suitable for being moved by means of an electric motor to selectively apply a pressing force on the friction members. According to the invention, for a given braking operation, a total braking force to be applied against the friction members of the brake is distributed in non-uniform manner amongst the actuators of the brake, such that at least two actuators apply respective different forces.

By distributing the total force in non-uniform manner among the actuators, the symmetry of the forces applied against the friction members is broken, thereby enabling vibration modes to be decoupled, and thus reducing the level of the vibration that is generated during a braking operation.

BRIEF DESCRIPTION OF THE DRAWINGS

The invention can be better understood in the light of the following description given with reference to the figures of the accompanying drawings, in which.

DETAILED DESCRIPTION OF THE INVENTION

Figure 1:
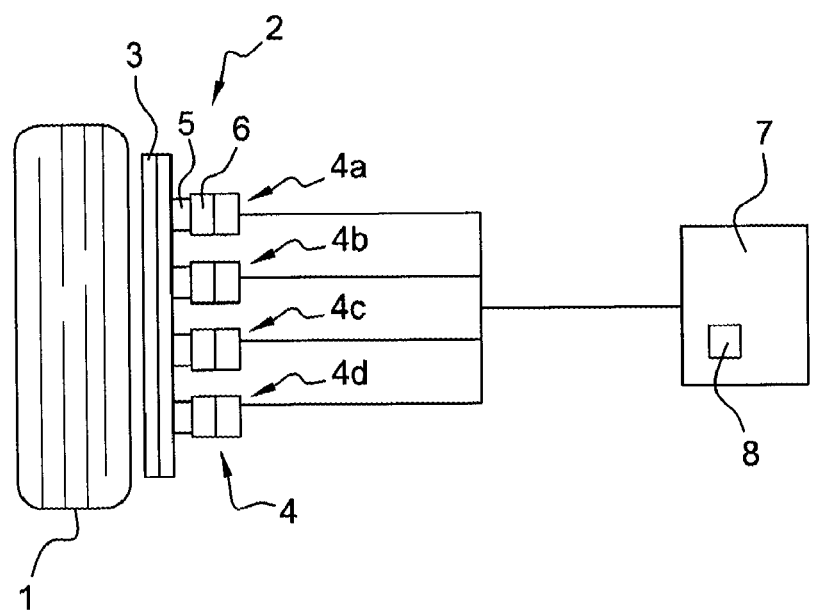
FIG. 1 shows a wheel provided with an electromechanical brake, and control means suitable for controlling actuators of the brake so as to perform the method of the invention.

The electromechanical braking method of the invention is performed on an aircraft having a certain number of wheels 1 referred to as "braked" wheels similar to the wheel shown in FIG. 1, each braked wheel 1 being braked by means of an electromechanical brake 2. Each brake 2 of the aircraft has friction members 3, in this example a stack of disks, and four electromechanical actuators 4, specifically actuators 4a, 4b, 4c, and 4d, each actuator 4 having a pusher 5 suitable for being moved by an electric motor 6 in order to selectively apply a pressing force against the stack of disks 3.

The actuators 4 are controlled by control means 7 that receive a braking setpoint issued as a result of a pilot of the aircraft actuating brake pedals or a so-called "autobrake" lever for obtaining automatic braking, the setpoint advantageously being corrected in application of an anti-lock protection function.

Usually, when a braking setpoint is issued, control is adjusted so that the total pressing force to be applied against the friction members of a brake is distributed uniformly between the actuators of the brake. For example, for a brake having four actuators, as in the present example, that means that braking control is defined so that each actuator applies a pressing force equal to 25% of the total required pressing force.

In contrast, the braking method of the invention consists in adapting the control means 7 in such a manner as to control the actuators 4 by distributing out the total pressing force in non-uniform manner between the actuators 4 of the brake 2. When controlling brakes in this way, during braking at least two actuators 4 apply respective different pressing forces. Controlling brakes in this way can nevertheless guarantee uniform wear for the brake (actuators, heat sinks, etc.).

Figure 2A:
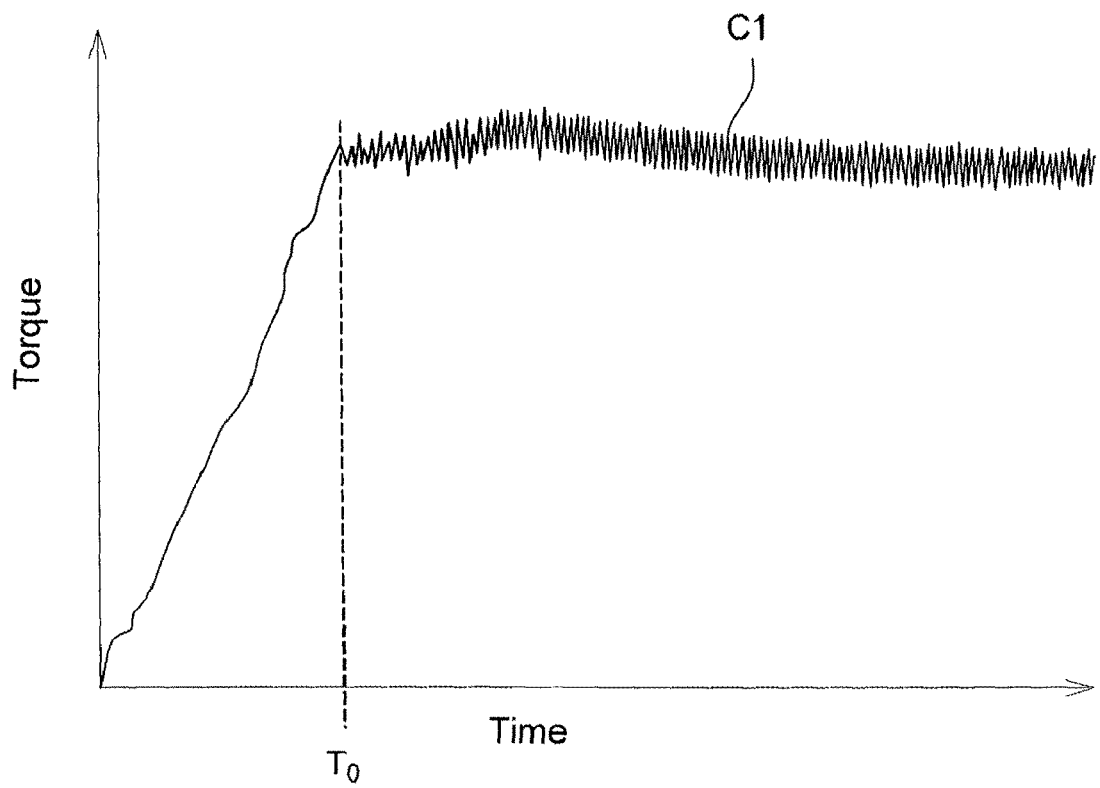
FIG. 2a shows braking torque measured during a first braking operation in accordance with the prior art, during which actuators of a brake were controlled in uniform manner.

FIG. 2a shows braking torque C1 as a function of time as measured during a first braking operation, the torque C1 being delivered to the brake 2 by the set of four actuators 4 of the brake 2. During this first braking operation, braking control was adjusted so that the total pressing force was distributed uniformly between the actuators 4 of the brake 2. It can be seen that high levels of vibration appeared at time t=T0, when the torque C1 reached a target value corresponding to the total required pressing force.

Figure 2B:
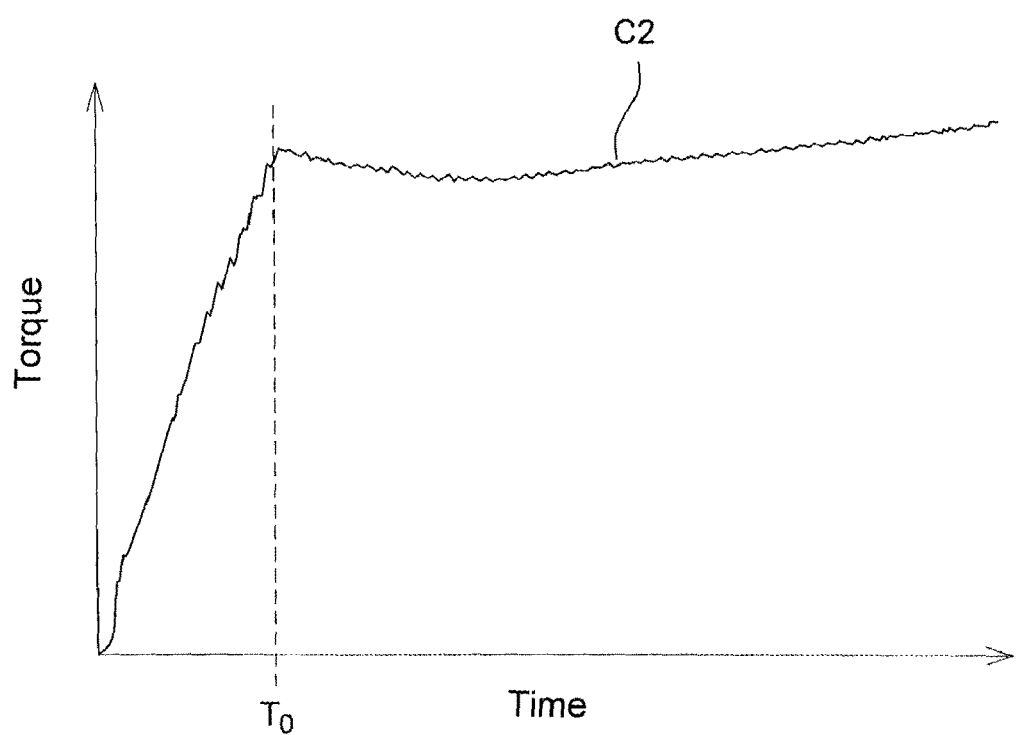
FIG. 2b shows braking torque measured during a second braking operation during which actuators of a brake were controlled in accordance with the braking method of the invention.

FIG. 2b shows braking torque C2 as a function of time during a second braking operation, the torque C2 being delivered to the brake 2 by the four actuators 4 of the brake 2. During this second braking operation, braking control was adjusted in such a manner that the total pressing force was distributed in non-uniform manner between the actuators 4 in accordance with the braking method of the invention. In this example, the braking commands given to the actuators 4 were adjusted so that two actuators deliver each a contribution of 32.5% to the total pressing force, i.e. together they applied 65% of the total force, one actuator delivered a contribution of 30%, and the fourth actuator contributed 5%. It should be observed that the vibrations that appeared at time t=T0, the time when the torque C2 reached the target value, was very low.

Figure 3:
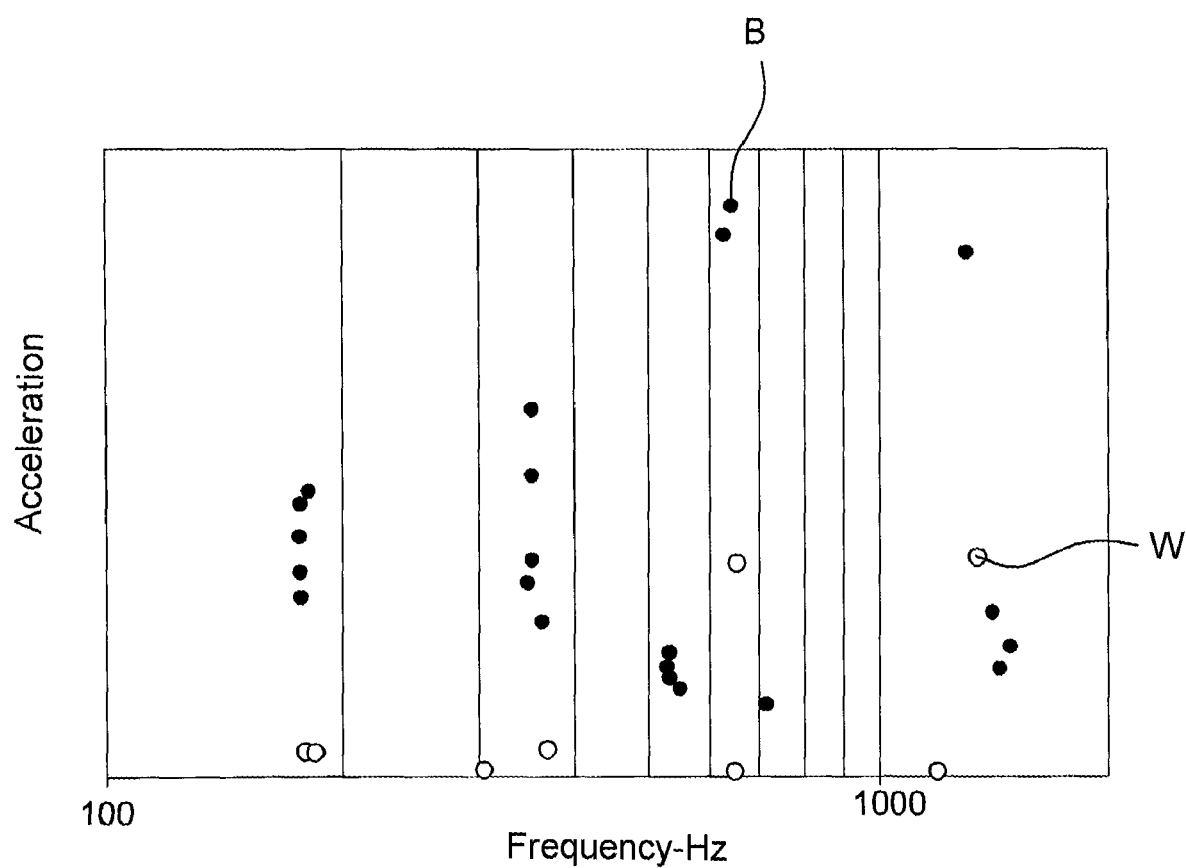
FIG. 3 shows vibration levels measured during the first and second braking operations.

Finally, FIG. 3 shows the amplitude levels of vibration expressed in terms of acceleration as a function of vibration frequency, as measured during the first braking operation during which the braking control was adjusted so that the total pressing force was distributed uniformly (levels represented by black dots B) and during the second braking operation during which the braking control was adjusted so that the total pressing force was distributed non-uniformly (levels represented by white dots W), using the distribution described above.

It can be seen once more that the vibration levels were lower during the second braking operation in which the braking control was such that the total pressing force was distributed non-uniformly among the actuators 4.

The curves and the clouds of dots in FIGS. 2a, 2b, and 3 show clearly that a non-uniform distribution of the pressing force between the actuators of a given brake enable vibration levels to be reduced significantly.

In order to avoid having premature wear or damage in an actuator 4 acting during each braking operation to apply a pressing force greater than the forces applied by the other actuators, and in order to avoid non-uniform wear of the friction faces of the disks 3 of the brake 2, provision is made for the braking control of the invention to change the non-uniform distribution of the braking control among the actuators 4 randomly or in predefined manner after a certain number of braking operations. The distribution of braking forces is modified before a braking operation, and not while braking is taking place.

In a preferred implementation, predefined contributions are thus stored in the control means. During a given braking operation, referred to herein as Br1, e.g. a first operation after loading predefined contributions into a memory module 8 of the control means 7, these contributions are distributed between the various actuators 4. Subsequent braking operations are referred to below as Br2, Br3, Br4, Br5, . . . .

Thus, by using contributions equal to 10%, 15%, 35%, and 40%, the distribution for braking operation Br1 consists in allocating the 10% contribution to the actuator 4a, the 15% contribution to actuator 4b, the 35% contribution to actuator 4c, and the 40% contribution to actuator 4d.

In a first implementation, the predefined contributions are permutated each time the distribution between the actuators 4 is modified so that each actuator 4 delivers in succession each of the contributions to the total force. Thus, for braking operation Br2, the contributions of the actuators 4a, 4b, 4c, and 4d are respectively 15%, 35%, 40%, and 10%, for braking operation Br3 they are 35%, 40%, 10%, and 15%, and for braking operation Br4 they are 40%, 10%, 15%, and 35%. For braking operation Br5, the distribution of the contributions between the actuators 4 is identical to that of braking operation Br1.

In a second implementation, the predefined contributions are allocated randomly to each actuator 4. It is thus possible that a given actuator 4 will deliver the same contribution before and after a modification, but the wear of the actuators 4 and of the disks 3 is considered as being uniform over a period that is sufficiently long.

The invention is not limited to the particular implementations described above, but on the contrary covers any variant coming within the ambit of the invention as defined by the claims.

Although the invention is described with the example of a brake having four actuators, the invention naturally applies to brakes having some other number of actuators (greater than one).

The braking contributions of each actuator are provided merely to illustrate the invention and the contributions may naturally be different.

The invention claimed is:

1. An electromechanical braking method for an aircraft having at least one electromechanical brake fitted to at least one braked wheel of the aircraft, the brake having friction members and a plurality of electromechanical actuators, each actuator comprising a pusher suitable for being moved by means of an electric motor to selectively apply a pressing force on the friction members, the method comprising:
applying, for a given braking operation, a total braking force against the friction members of the brake, each actuator applying a pressing force and delivering a predefined contribution to the total braking force, the total braking force distributed in non-uniform manner amongst the actuators of the brake, such that at least two actuators apply respective different forces,
wherein the plurality of actuators comprise a first actuator, a second actuator, a third actuator and a fourth actuator, wherein the total braking force is distributed such that the first actuator applies 32.5%, the second actuator applies 32.5%, the third actuator applies 30% and the fourth actuator applies 5% of the total braking force, and
modifying the distribution among the actuators randomly or in a predefined manner after one or more braking operations.

2. The braking method according to claim 1, wherein, for a given braking operation, each actuator delivers a predefined contribution to the total force, and wherein, on each modification of the distribution, the predefined contributions are permutated between the actuators so that each actuator delivers successively each of the predefined contributions to the total force.

3. The braking method according to claim 1, wherein, for a given braking operation, each actuator delivers a predefined contribution to the total force, and wherein, on each modification of the distribution, the predefined contributions are allocated randomly to each of the actuators.

4. The braking method according to claim 1, wherein the total braking force is applied such that each of the actuators applies a respective non-zero different force.

5. An electromechanical braking method for an aircraft having at least one electromechanical brake fitted to at least one braked wheel of the aircraft, the brake having friction members and a plurality of electromechanical actuators, each actuator comprising a pusher suitable for being moved by means of an electric motor to selectively apply a pressing force on the friction members, the method comprising:
applying, for a given braking operation, a total braking force against the friction members of the brake, each actuator applying a pressing force and the total braking force being distributed in non-uniform manner amongst the actuators of the brake, such that at least two actuators apply respective different forces, and
wherein the plurality of actuators comprise a first actuator, a second actuator, a third actuator and a fourth actuator, wherein the total braking force is distributed such that the first actuator applies 10%, the second actuator applies 15%, the third actuator applies 35% and the fourth actuator applies 40% of the total braking force, and wherein, on a subsequent braking operation, the distribution is modified such that the first actuator applies 15%, the second actuator applies 35%, the third actuator applies 40% and the fourth actuator applies 10% of the total braking force, and modifying the distribution among the actuators randomly or in a predefined manner after one or more braking operations.

6. The braking method according to claim 5, wherein, for a given braking operation, each actuator delivers a predefined contribution to the total force, and wherein, on each modification of the distribution, the predefined contributions are permutated between the actuators so that each actuator delivers successively each of the predefined contributions to the total force.

7. The braking method according to claim 5, wherein, for a given braking operation, each actuator delivers a predefined contribution to the total force, and wherein, on each modification of the distribution, the predefined contributions are allocated randomly to each of the actuators.

8. The braking method according to claim 5, wherein the total braking force is applied such that each of the actuators applies a respective non-zero different force.

9. A method comprising:

applying, for a given braking operation of a wheel of an aircraft, a total braking force against a plurality of friction members of a brake of the wheel, distributed non-uniformly among a plurality of actuators of the brake, each actuator applying a pressing force, the plurality of actuators comprise a first actuator, a second actuator, a third actuator and a fourth actuator, wherein the total braking force is distributed such that the first actuator applies 32.5%, the second actuator applies 32.5%, the third actuator applies 30% and the fourth actuator applies 5% of the total braking force, and after one or more braking operations, modifying the non-uniform distribution of the applied force among the actuators randomly or in a predefined manner.

10. The method according to claim 9, wherein the total braking force is applied such that each of the actuators apply respective non-zero different forces.

* * * * *